United States Patent
Gross et al.

(10) Patent No.: US 10,162,809 B2
(45) Date of Patent: Dec. 25, 2018

(54) METHOD AND APPARATUS FOR CUSTOMIZED HANDWRITING ENTRY ZONES

(71) Applicant: Xerox Corporation, Norwalk, CT (US)

(72) Inventors: Eric Michael Gross, Rochester, NY (US); Dean A. Coxford, Rochester, NY (US)

(73) Assignee: Conduent Business Services, LLC, Dallas, TX (US)

( * ) Notice: Subject to any disclaimer, the term of this patent is extended or adjusted under 35 U.S.C. 154(b) by 396 days.

(21) Appl. No.: 14/052,415

(22) Filed: Oct. 11, 2013

(65) Prior Publication Data
US 2015/0106684 A1   Apr. 16, 2015

(51) Int. Cl.
| | | |
|---|---|---|
| G06F 17/00 | (2006.01) | |
| G06F 17/24 | (2006.01) | |
| G06K 9/00 | (2006.01) | |
| G06F 3/0488 | (2013.01) | |
| G06K 9/20 | (2006.01) | |

(52) U.S. Cl.
CPC ........ G06F 17/243 (2013.01); G06F 3/04883 (2013.01); G06F 17/242 (2013.01); G06K 9/00409 (2013.01); G06K 9/2081 (2013.01); G06K 2209/01 (2013.01)

(58) Field of Classification Search
CPC .......... G06F 17/24; G06F 17/25; G06T 11/60; A63F 2300/5553; A63F 2300/6623
USPC ................................ 715/201, 202, 230, 255
See application file for complete search history.

(56) References Cited

U.S. PATENT DOCUMENTS

| | | | | |
|---|---|---|---|---|
| 5,034,991 | A * | 7/1991 | Hagimae | G06K 9/3283 |
| | | | | 382/171 |
| 5,502,461 | A * | 3/1996 | Okamoto et al. | 345/173 |
| 5,864,636 | A * | 1/1999 | Chisaka | G06F 3/04883 |
| | | | | 345/179 |
| 8,780,117 | B2 * | 7/2014 | Ishiguro | G06F 3/04883 |
| | | | | 345/467 |
| 2004/0203594 | A1* | 10/2004 | Kotzin et al. | 455/411 |
| 2006/0062467 | A1* | 3/2006 | Zou | G06K 9/222 |
| | | | | 382/186 |
| 2006/0214000 | A1* | 9/2006 | Lapstun | G06F 3/014 |
| | | | | 235/462.44 |
| 2009/0213085 | A1* | 8/2009 | Zhen | G06F 3/04883 |
| | | | | 345/173 |
| 2010/0149206 | A1* | 6/2010 | Shigehisa | G06F 3/04883 |
| | | | | 345/595 |
| 2010/0245875 | A1* | 9/2010 | Komaki | G06K 9/00469 |
| | | | | 358/1.11 |
| 2013/0162606 | A1* | 6/2013 | Araumi | G06F 3/041 |
| | | | | 345/179 |

(Continued)

*Primary Examiner* — Andrew R Dyer
*Assistant Examiner* — Jenq-Kang Chu

(57) ABSTRACT

A method, non-transitory computer readable medium, and apparatus for providing a customized handwriting zone are disclosed. For example, the method receives a handwriting sample for a user, measures dimensions of the handwriting sample for the user, generates one or more handwriting zones that are sized in accordance with the dimensions of the handwriting sample of the user, receives a request to generate a form for the user and provides the form that includes the one or more handwriting zones that are customized in accordance with the dimensions of the handwriting sample of the user.

6 Claims, 4 Drawing Sheets

(56) References Cited

U.S. PATENT DOCUMENTS

2014/0344684 A1* 11/2014 Jang ................... G06F 3/04883
715/709

* cited by examiner

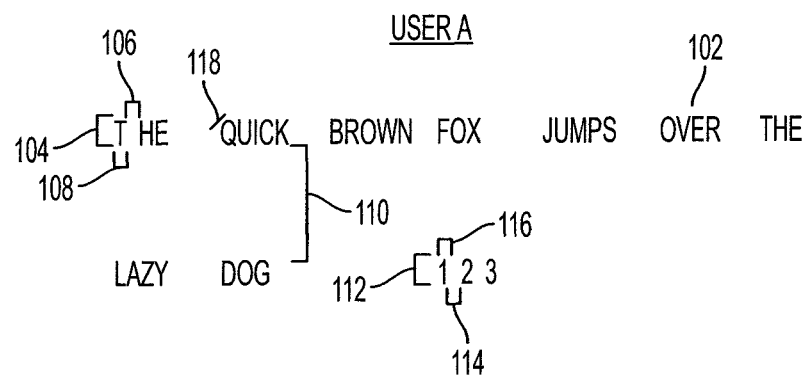
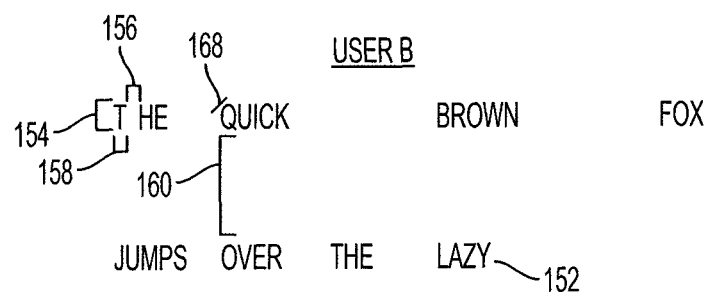
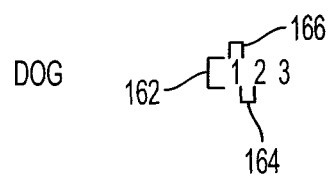
FIG. 1

METHOD AND APPARATUS FOR CUSTOMIZED HANDWRITING ENTRY ZONES

The present disclosure relates generally to handwritten entries on a form or test and, more particularly, to a method and an apparatus for customized handwriting entry zones.

BACKGROUND

Some standardized forms use pre-determined areas to collect information. For example, many tests use a form that includes multiple choice or bubbles that are filled in predetermined areas of the form that can be scanned and read to identify a user's selections or answers. However, not all forms or tests can be performed with multiple choices or bubble fills.

Many forms still require handwriting to submit information. However, handwriting is difficult to reliably interpret. Handwriting can be especially difficult to interpret when the letters merge together or the handwriting is in script. Character segmentation algorithms are available or deployed, but in practice the character segmentation algorithms perform poorly and are computationally expensive.

SUMMARY

According to aspects illustrated herein, there are provided a method, a non-transitory computer readable medium, and an apparatus for providing a customized handwriting zone. One disclosed feature of the embodiments is a method that receives a handwriting sample for a user, measures dimensions of the handwriting sample for the user, generates one or more handwriting zones that are sized in accordance with the dimensions of the handwriting sample of the user, receives a request to generate a form for the user and provides the form that includes the one or more handwriting zones that are customized in accordance with the dimensions of the handwriting sample of the user Another disclosed feature of the embodiments is a non-transitory computer-readable medium having stored thereon a plurality of instructions, the plurality of instructions including instructions which, when executed by a processor, cause the processor to perform operations that receives a handwriting sample for a user, measures dimensions of the handwriting sample for the user, generates one or more handwriting zones that are sized in accordance with the dimensions of the handwriting sample of the user, receives a request to generate a form for the user and provides the form that includes the one or more handwriting zones that are customized in accordance with the dimensions of the handwriting sample of the user Another disclosed feature of the embodiments is an apparatus comprising a processor and a computer readable medium storing a plurality of instructions which, when executed by the processor, cause the processor to perform an operation that receives a handwriting sample for a user, measures dimensions of the handwriting sample for the user, generates one or more handwriting zones that are sized in accordance with the dimensions of the handwriting sample of the user, receives a request to generate a form for the user and provides the form that includes the one or more handwriting zones that are customized in accordance with the dimensions of the handwriting sample of the user

BRIEF DESCRIPTION OF THE DRAWINGS

The teaching of the present disclosure can be readily understood by considering the following detailed description in conjunction with the accompanying drawings, in which:

FIG. 1 illustrates example handwriting samples and the dimensions that are measured;

To facilitate understanding, identical reference numerals have been used, where possible, to designate identical elements that are common to the figures.

DETAILED DESCRIPTION

Figure 2:
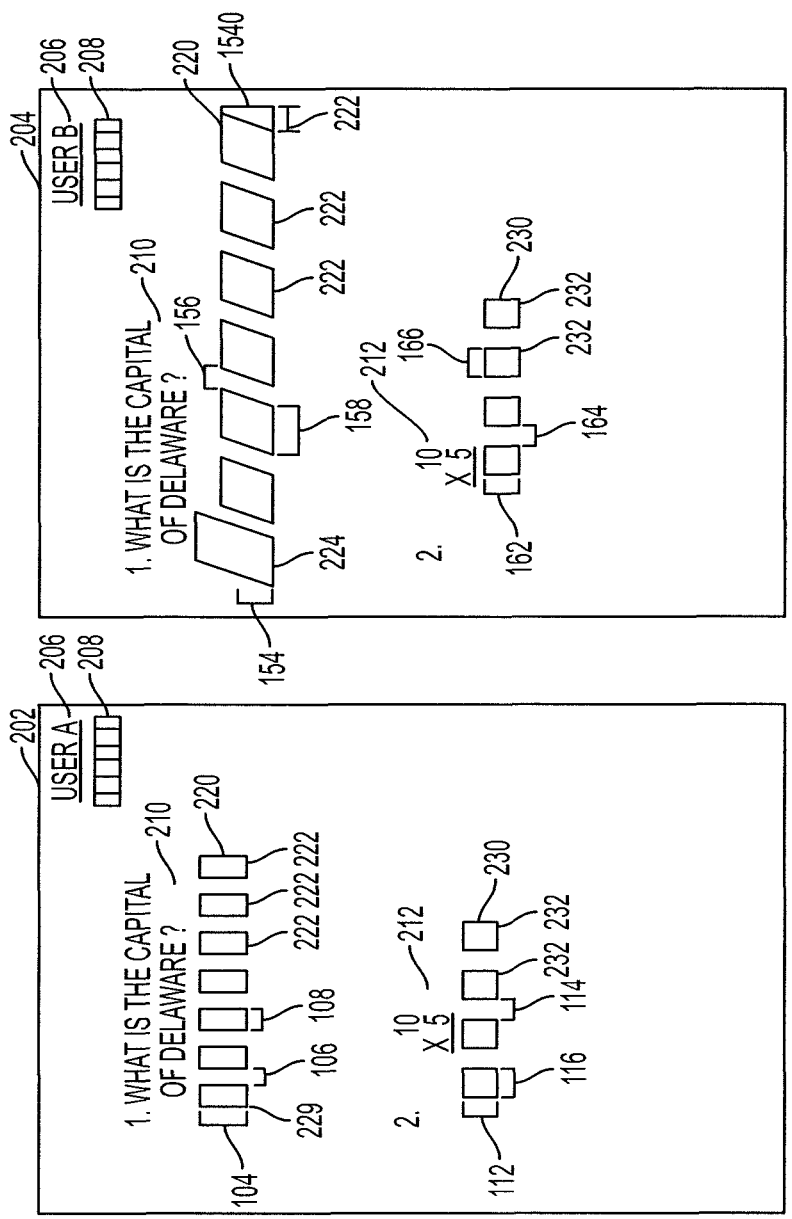
FIG. 2 illustrates an example form with one or more handwriting zones that are customized for the user.

The present disclosure broadly discloses a method and non-transitory computer-readable medium for providing a customized handwriting zone. As discussed above, many forms still require handwriting to submit information. However, handwriting is difficult to reliably interpret. Handwriting can be especially difficult to interpret when the letters merge together or the handwriting is in script. Character segmentation algorithms are available or deployed, but in practice the character segmentation algorithms perform poorly and are computationally expensive.

In addition, when filling in forms with predefined areas for providing handwriting, the areas are typically the same size for every form for every user. However, each user has a different style of handwriting that varies in size, spacing and angle or slope. As a result, many users may find writing in the areas requiring handwriting to be uncomfortable. Thus, one embodiment of the present disclosure provides a customized handwriting zone. For example, the handwriting zone may be sized in accordance with dimensions of a user's handwriting.

FIG. 1 illustrates an example of handwriting samples 102 and 152. In one embodiment, each user may submit one or more handwriting samples to have various dimensions of his or her handwriting analyzed. The dimensions may be used to customize the user's handwriting zones on various forms, such as for example, academic exams or tests.

For example, FIG. 1 illustrates a handwriting sample 102 of a user A and a handwriting sample 152 of user B. In one embodiment, each user may submit more than one handwriting sample. In one embodiment, the handwriting samples 102 and 152 may be submitted in paper form. The paper forms may be scanned and analyzed via an optical character reader (OCR) or other similar technologies.

In another embodiment, the handwriting samples 102 and 152 may be submitted on an electronic endpoint device such as a tablet computer or laptop computer. For example, the endpoint device may have a touch screen area where a user is asked to provide a writing sample and the endpoint device may analyze and measure the dimensions of the user's handwriting. In one embodiment, the endpoint device may be embodied as a general purpose computer with a processor and a memory as discussed below and illustrated in FIG. 4. The handwriting sample may be provided as print or script depending on the type of character segmentation, OCR or other software technology that is available to perform the analysis of the handwriting samples.

In one embodiment, the dimensions may include a height of each character, a width of each character, a width of a space between each character, a width of a space between lines, and the like. In one embodiment, the dimensions may be measured for both letters and numbers separately as a user may have different dimensions associated with how he or she writes letters and numbers. The dimensions listed above are provided as examples and it should be noted that any other dimensions associated with the handwriting to correctly adapt a size of the handwriting zones for a user may be measured or analyzed.

For example, the handwriting sample 102 of user A may have a character height 104, a character width 108, a character spacing 106, a character slope or angle 118 and a line spacing 110 for the letters. The handwriting sample 102 may also have a character height 112, a character width 116 and a character spacing 114 for the numbers.

With respect to the handwriting sample 152 of user B, the handwriting sample 152 may have a character height 154, a character width 158, a character spacing 156, a character slope or angle 168 and a line spacing 160. The handwriting sample 152 may also have a character height 162, a character width 166 and a character spacing 164 for the numbers.

In one embodiment, the dimensions may be also measured for capitalized letters and non-capitalized letters. This information may also help determine if a user writes in all capitalized letters or capitalized and non-capitalized letters. For example, if the dimensions of all of the characters for letters are the same, the user may be presumed to write in all caps or all lower case letters and the corresponding handwriting zones in the forms may be all the same size. However, if the user does have a different dimension or each first character of a sentence, a first box of each sentence in the handwriting zone or a first box for words that should be capitalized in the handwriting zone may be sized differently.

In one embodiment, if multiple handwriting samples are received, an average may be taken for all of the dimensions measured for each user. Alternatively, a maximum value may be selected based on the multiple handwriting samples or a median value, and the like. As a result, proper dimensions for a handwriting zone may be adapted to each different user based upon the dimensions analyzed in the handwriting samples. In one embodiment, the dimensions for each user may be stored in the endpoint device or a centralized server for the school or service provider that generates the forms. The information may then be retrieved to generate forms that have handwriting zones with the proper dimensions for each user.

FIG. 2 illustrates example forms 202 and 204 that have one or more handwriting zones 220 and 230 that are customized for a user. For example, the forms 202 and 204 may be an academic test form or exam. Although the forms illustrated in FIG. 2 are a test, it should be noted that the forms 202 and 204 may be any type of form requiring handwriting zones such as a survey, an application, and the like.

The forms 202 and 204 may be identical in every respect except for the dimensions of each box 222 and 232 of the handwriting zones 220 and 230. In one embodiment, the forms 202 and 204 may each have a name of the user 206 and/or a barcode 208 associated with the name of the user. For example, when the forms 202 and 204 are generated, the barcode may include information about the user and the associated dimensions for the handwriting zones 220 and 230 such that the boxes 222 and 232 are sized properly for the user. In addition, based on the name of the user 206 the correct form is distributed to each individual user.

For example, the form 202 may be for user A. In FIG. 1, user A submitted the handwriting sample 102 with a character height 104, a character width 108, a character spacing 106 and a line spacing 110 for the letters and a character height 112, a character width 116 and a character spacing 114 for the numbers. Accordingly, the boxes 222 in the handwriting zone 220 that require letters are each sized with a character height 104, a character width 108 and character spacing 106. If the answer required multiple lines, the boxes 222 would have a line spacing of 110 in consecutive lines. In addition, the boxes 232 in the handwriting zone 230 that require numbers are each sized with a character height 112, a character width 116 and a character spacing 114.

In one embodiment, the user A may have the boxes 222 that have a vertical slope of approximately 90 degrees as the user may write relatively straight up and down based on the handwriting sample analysis. In addition, the user A may have a first box 229 that is the same size as the remaining boxes 222 because the user A tends to write in all caps.

It should be also noted that the number of boxes 222 and 232 do not correspond to the number of letters or numbers in the answer. For example the answer to question (1) may be Dover; however, more than five boxes 222 are provided. Similarly, the answer to question (2) may be 50; however, more than two boxes 232 are provided.

The form 204 may be for user B. In FIG. 1, user B submitted the handwriting sample 152 with a character height 154, a character width 158, a character spacing 156 and a line spacing 160 for the letters and a character height 162, a character width 166 and a character spacing 164 for the numbers. Accordingly, the boxes 222 in the handwriting zone 220 that require letters are each sized with a character height 154, a character width 158 and a character spacing 156. If the answer required multiple lines, the boxes 222 would have a line spacing of 160 in consecutive lines. In addition, the boxes 232 in the handwriting zone 230 that require numbers are each sized with a character height 162, a character width 166 and a character spacing 164.

In one embodiment, the user B may have the boxes 222 that have a vertical slope of approximately 45 degrees as the user may write at an angle based on the handwriting sample analysis. In addition, the user B may have a first box 224 that is sized larger than the remaining boxes 222 because the user B tends to properly capitalize the first letter of proper nouns and uses both capital letters and lower case letters.

In one embodiment, the forms 202 and 204 may be generated and provided as an electronic form on a user's endpoint device. In one embodiment, if the forms 202 and 204 are an electronic form, the user may be provided an option to tune the dimensions of the boxes 222 and 232 manually. For example, the user may specify the height, the width, the spacing, the slope or angle for the letters, numbers, special characters, and the like. The user may also, via a user interface, manually adjust the height, width, spacing and slope for forms that are to be printed and distributed on paper.

Thus, as can be illustrated in FIG. 2 each user would have handwriting zones 220 and 230 that are customized for each different user. The user is provided a more comfortable handwriting zone 220 and 230 that is customized to the dimensions of his or her handwriting. Consequently, the user is provided a more positive experience without the annoyance of having handwriting zones that may not be comfortable for a user's size of handwriting.

Figure 3:
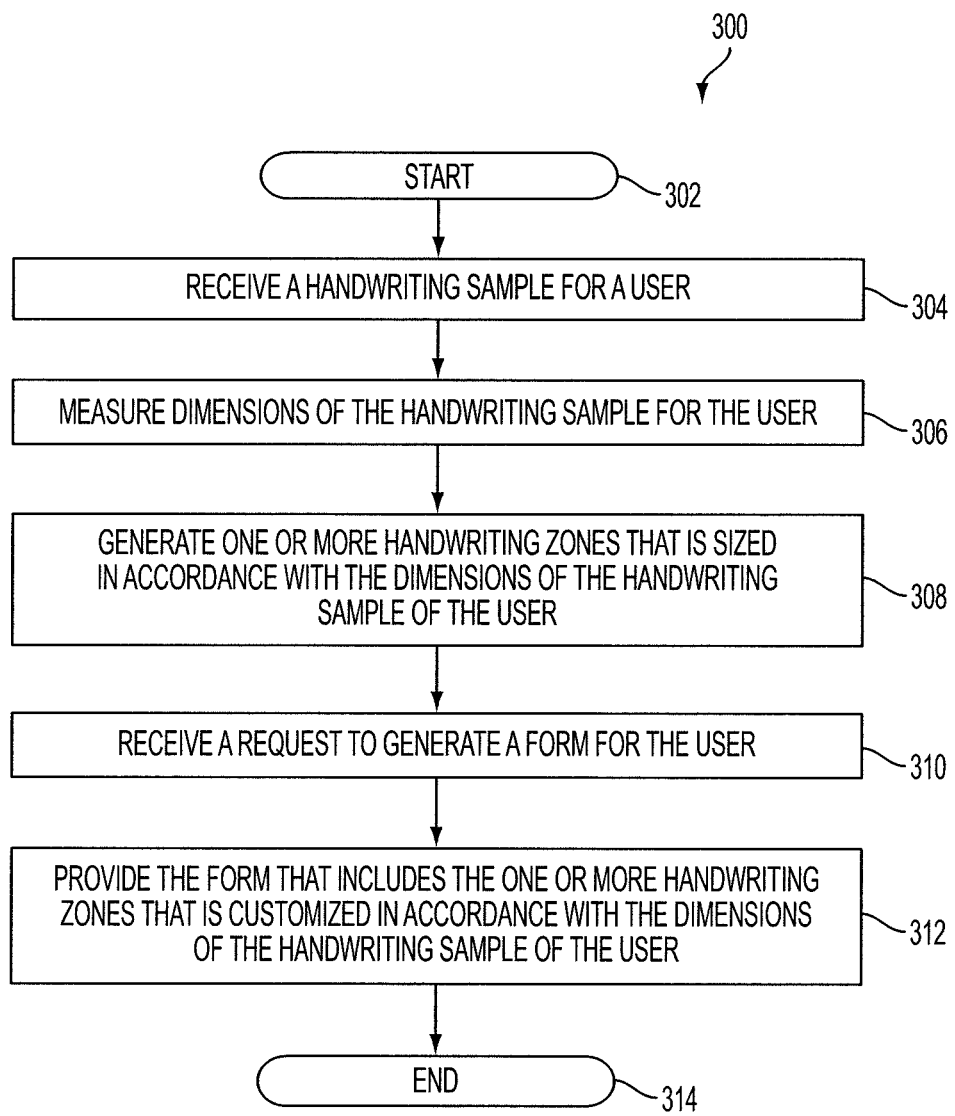
FIG. 3 illustrates an example flowchart of a method for providing a customized handwriting zone.
Figure 4:
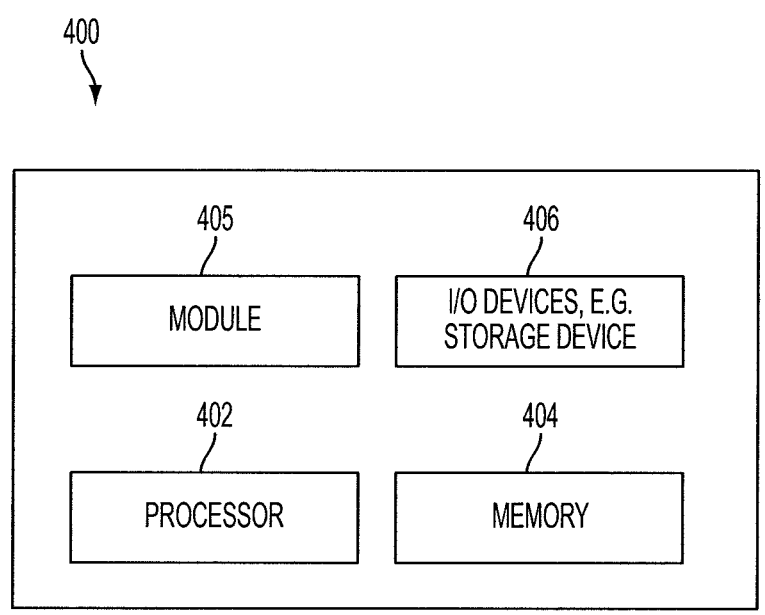
FIG. 4 illustrates a high-level block diagram of a general-purpose computer suitable for use in performing the functions described herein.

FIG. 3 illustrates a flowchart of a method 300 for providing a customized handwriting zone. In one embodiment, one or more steps or operations of the method 300 may be performed by a general-purpose computer as illustrated in FIG. 4 and discussed below.

The method 300 begins at step 302. At step 304, the method 300 receives a handwriting sample for a user. For example, a plurality of different users may each submit a handwriting sample for analysis. In one embodiment, each one of the plurality of different users may submit one or more handwriting samples. The handwriting samples may be provided on paper and scanned or may be provided directly onto an endpoint device. The handwriting samples may be in print or script. The handwriting samples may include letters, numbers, punctuation, or special characters such as %, #, $, and the like.

At step 306, the method 300 measures dimensions of the handwriting sample for the user. For example, the dimensions may include a character height, a character width, a character spacing and a line spacing. In one embodiment, the dimensions may be measured separately for letters and numbers.

In one embodiment, the dimensions may be an average of each one of the various dimensions that are measured if a plurality of handwriting samples for a user is received. In another embodiment, the dimensions may be a maximum of each one of the various dimensions that are measured if a plurality of handwriting samples for a user is received. In another embodiment, the dimensions may be a median of each one of the various dimensions that are measured if a plurality of handwriting samples for a user is received. In one embodiment, the dimensions of the handwriting sample or samples may be measured for each one of a plurality of different users that each submits one or more handwriting samples for analysis and measurements.

At step 308, the method 300 generates one or more handwriting zones that are sized in accordance with the dimensions customized for the user. For example, the handwriting zones may include one or more boxes that require handwritten information in the handwriting zones. The size of the boxes may be set to the dimensions of a user's handwriting that is measured in step 306. In other words, the method 300 may customize the handwriting zones for a user based upon analysis of his or her handwriting samples.

In one embodiment, each one of a plurality of different users may be associated with a different respective size of boxes for the handwriting zones. For example, user A and user B may be required to enter information on the same form. However, the form for user A may have boxes in the handwriting zones that are different in size and dimensions than the boxes in the form for user B based upon the dimensions measured in the handwriting samples received for user A and user B.

In one embodiment, the size and dimensions of the boxes for the handwriting zones for each different user may be stored in a centrally located server of a school or service provider. As a result, the size and dimensions of the boxes for the handwriting zones may be used to generate various forms that include handwriting zones.

At step 310, the method 300 receives a request to generate a form for the user. For example, a school may need to generate a test form that requires handwriting zones. Thus, the request may include identification for each one of a plurality of different students. The identification of the students may correlate to a particular size or dimensions that should be used to customize the handwriting zone for a respective student.

At step 312, the method 300 provides the form that includes the one or more handwriting zones that are sized in accordance with the dimensions customized for the user. For example, the form that is generated may include different sized handwriting zones for each one of a plurality of different users. In other words, the forms may be identical in all respects except for the handwriting zones.

The forms may also include an identification or name of each one of the plurality of different users. For example, the forms may include bar codes that can be read or scanned or simply the name of the user. As a result, the forms may be handed to the correct student or user as the boxes in the handwriting zones are sized in accordance with the dimensions of the user's handwriting. The method 300 then proceeds to step 314 where the method 300 ends.

It should be noted that although not explicitly specified, one or more steps, functions, or operations of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 3 that recite a determining operation, or involve a decision, do not necessarily require that both branches of the determining operation be practiced. In other words, one of the branches of the determining operation can be deemed as an optional step.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing a customized handwriting zone, and various input/output devices 406 (e.g., storage devices, including but not limited to, a tape drive, a floppy drive, a hard disk drive or a compact disk drive, a receiver, a transmitter, a speaker, a display, a speech synthesizer, an output device (such as a graphic display, printer, and the like), an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 405 for providing a customized handwriting zone can be loaded into memory 404 and executed by processor 402 to implement the functions as discussed above. As such, the present method 405 for providing a customized handwriting zone (including associated data structures) of the present disclosure can be stored on a non-transitory (e.g., physical and tangible) computer readable storage medium, e.g., RAM memory, magnetic or optical drive or diskette and the like. For example, the hardware processor 402 can be programmed or configured with instructions (e.g., computer readable instructions) to perform the steps, functions, or operations of method 300.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for providing a form, comprising:
receiving, by a processor of an endpoint device, a handwriting sample for a plurality of different users;
measuring, by the processor, dimensions of the handwriting sample for each one of the plurality of different users, wherein the dimensions comprise a height of each character in the handwriting sample, a width of the each character in the handwriting sample, a space in between the each character in the handwriting sample, and a slope of the each character in the handwriting sample, wherein the dimensions comprise a first set of dimensions for letters and a second set of dimensions for numbers;
generating, by the processor, for the each one of the plurality of different users one or more handwriting zones that are sized in accordance with the dimensions of the handwriting sample of the respective user of the plurality of different users;
storing, by the processor, in a centrally located server that is remotely located from the endpoint device the one or more handwriting zones that are generated for the each one of the plurality of different users that are sized in accordance with the dimensions of the handwriting sample of the respective user;
receiving, by the processor, a request to generate the form for the plurality of different users;
retrieving, by the processor, from the centrally located server the one or more handwriting zones that are sized in accordance with the dimensions of the handwriting sample of the respective user;
generating, by the processor, the form for the each one of the plurality of different users on a respective electronic display of a touch screen device, wherein the form includes the one or more handwriting zones that are customized in accordance with the dimensions of the handwriting sample of the respective user, wherein the form for the each one of the plurality of different users is identical except for dimensions of the one or more handwriting zones;
providing, by the processor, an option to tune the dimensions of the one or more handwriting zones that are displayed on the respective electronic display of the touch screen device;
receiving, by the processor, an input to tune the dimensions of the one or more handwriting zones that are displayed on the respective electronic display of the touch screen device of one of the plurality of different users via the option to tune the dimensions; and
changing, by the processor, the dimensions of the one or more handwriting zones that are displayed on the respective electronic display of the touch screen device of the one of the plurality of different users.

2. The method of claim 1, wherein the handwriting sample for the plurality of different users comprises a plurality of handwriting samples and the dimensions comprise an average of each one of the dimensions from the plurality of handwriting samples.

3. The method of claim 1, wherein the one or more handwriting zones comprise a plurality of boxes that are sized in accordance with the dimensions.

4. A non-transitory computer-readable medium storing a plurality of instructions which, when executed by a processor of an endpoint device, cause the processor to perform operations for providing a form, the operations comprising:
receiving a handwriting sample for a plurality of different users;
measuring dimensions of the handwriting sample for each one of the plurality of different users, wherein the dimensions comprise a height of each character in the handwriting sample, a width of the each character in the handwriting sample, a space in between the each character in the handwriting sample, and a slope of the each character in the handwriting sample, wherein the dimensions comprise a first set of dimensions for letters and a second set of dimensions for numbers;
generating for the each one of the plurality of different users one or more handwriting zones that are sized in accordance with the dimensions of the handwriting sample of the respective user of the plurality of different users;
storing in a centrally located server that is remotely located from the endpoint device the one or more handwriting zones that are generated for the each one of the plurality of different users that are sized in accordance with the dimensions of the handwriting sample of the respective user;
receiving a request to generate the form for the plurality of different users;
retrieving from the centrally located server the one or more handwriting zones that are sized in accordance with the dimensions of the handwriting sample of the respective user;
generating the form for the each one of the plurality of different users, wherein the form includes the one or more handwriting zones that are customized in accordance with the dimensions of the handwriting sample of the respective user, wherein the form for the each one of the plurality of different users is identical except for dimensions of the one or more handwriting zones;
providing an option to tune the dimensions of the one or more handwriting zones that are displayed on the respective electronic display of the touch screen device;
receiving an input to tune the dimensions of the one or more handwriting zones that are displayed on the respective electronic display of the touch screen device of one of the plurality of different users via the option to tune the dimensions; and
changing the dimensions of the one or more handwriting zones that are displayed on the respective electronic display of the touch screen device of the one of the plurality of different users.

5. The non-transitory computer-readable medium of claim 4, wherein the handwriting sample for the plurality of different users comprises a plurality of handwriting samples and the dimensions comprise an average of each one of the dimensions from the plurality of handwriting samples.

6. The non-transitory computer-readable medium of claim 4, wherein the one or more handwriting zones comprise a plurality of boxes that are sized in accordance with the dimensions.

* * * * *